United States Patent [19]

Horvath

[11] Patent Number: 4,724,938
[45] Date of Patent: Feb. 16, 1988

[54] METHOD OF MAKING AND CHECKING THE JOUNCE AND REBOUND ACTIONS OF AN HYDRAULIC DAMPER

[75] Inventor: Richard A. Horvath, Dayton, Ohio

[73] Assignee: General Motors Corporation, Detroit, Mich.

[21] Appl. No.: 9,647

[22] Filed: Jan. 28, 1987

Related U.S. Application Data

[63] Continuation of Ser. No. 806,439, Dec. 9, 1985, abandoned.

[51] Int. Cl.⁴ .............................................. F16F 9/00
[52] U.S. Cl. ............................... 188/382; 188/322.17; 73/11
[58] Field of Search ................ 73/11, 52–56, 73/40; 116/266; 188/318, 315, 314, 313, 311, 322.14, 322.13, 322.16, 322.17, 280–282, 266, 322.19, 322.15, 1.11, 382; 280/696

[56] References Cited

U.S. PATENT DOCUMENTS

| | | | |
|---|---|---|---|
| 3,199,637 | 8/1965 | Herman | 188/318 |
| 4,175,771 | 11/1979 | Muzechak et al. | 280/696 |
| 4,314,473 | 2/1982 | Sulzer | 73/11 |
| 4,355,532 | 10/1982 | Ikeda et al. | 73/11 |
| 4,364,457 | 12/1982 | Wossner et al. | 188/322.17 |
| 4,376,387 | 3/1983 | Stevens et al. | 73/11 |
| 4,438,834 | 3/1984 | Handke et al. | 188/322.17 X |
| 4,485,899 | 12/1984 | Grundel | 188/322.17 X |

FOREIGN PATENT DOCUMENTS

| | | |
|---|---|---|
| 1035412 | 7/1958 | Fed. Rep. of Germany ......... 188/322.17 |
| 2257556 | 5/1974 | Fed. Rep. of Germany ......... 188/322.17 |
| 1126815 | 12/1956 | France ......... 188/322.17 |

Primary Examiner—Douglas C. Butler
Attorney, Agent, or Firm—Charles R. White

[57] ABSTRACT

Bleed orifices are formed in the lower end of the rod guide of a double acting hydraulic strut or shock unit. The bleed orifices are of sufficient size and number that when a rod guide designed for a larger bore unit is assembled in a unit with a smaller bore cylinder tube, a large fluid leak path is produced between the cylinder tube and the reservoir tube. This leak greatly reduces rebound damping force that the unit normally produces. When checked for damping performance before final shipment of the unit, the low damping force is readily detected and the unit is rejected for repair.

1 Claim, 3 Drawing Figures

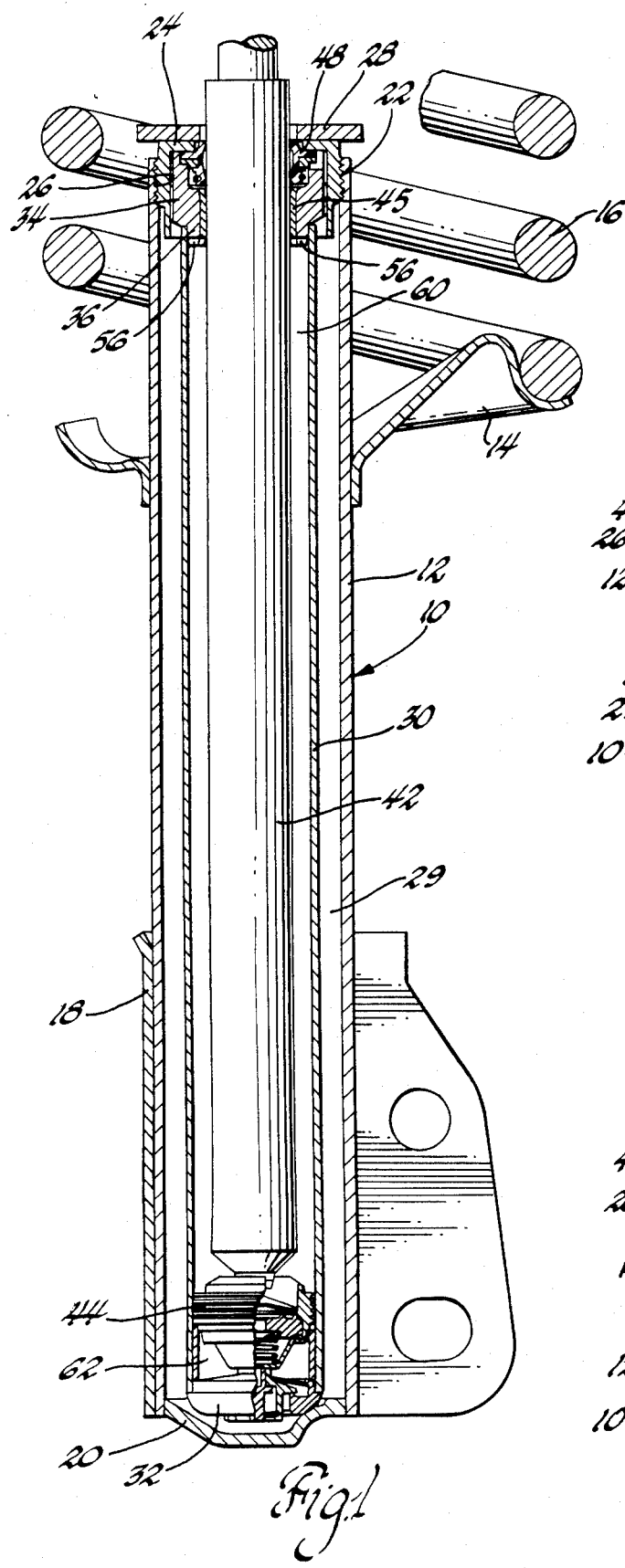
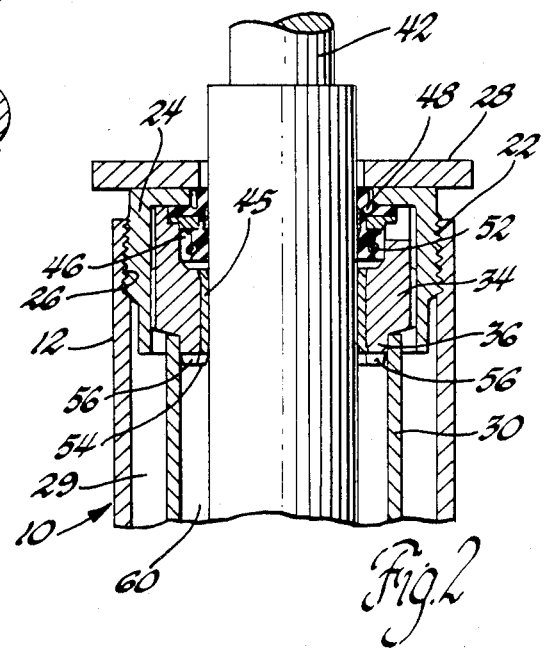
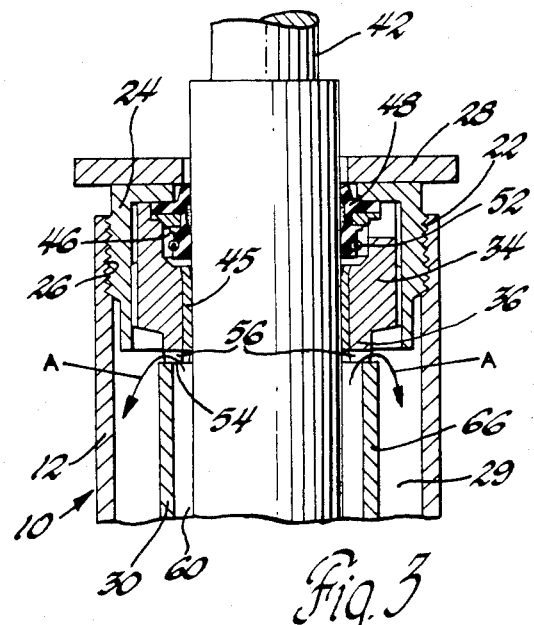

METHOD OF MAKING AND CHECKING THE JOUNCE AND REBOUND ACTIONS OF AN HYDRAULIC DAMPER

This is a continuation of application Ser. No. 806,439, filed on Dec. 9, 1985, now abandoned.

This invention relates to hydraulic dampers and more particularly to a new and improved rod guide construction for struts and shocks having a first bore size which incorporates an internal cylinder tube to reservoir oil bypass if assembled on a damper having bore size smaller than the first bore size to optimize testing and quality production of dampers.

Prior to the present invention hydraulic dampers have, after assembly, been stroked by special testing machines to ascertain their functionality to ensure effective damping of the ride motions of a vehicle. While the prior testing has been highly effective, new and higher standards are needed for more efficient and effective production of higher quality units.

The present invention is drawn to an internal structure within the damper of the strut or shock which makes the testing more accurate and assures the proper assembly of the damper.

It is a feature, object and advantage of this device to ensure the production and shipping of a strut damper with optimized operating efficiency and service life. In the preferred embodiment of this invention, a bleed orifice is formed in the lower end of the rod guide. This orifice is of sufficient size or number that when a rod guide designed for a large size bore unit is assembled with a smaller size bore unit, a large fluid leak path is formed between the cylinder tube and the reservoir tube. This leak path greatly reduces the rebound damping force that the unit normally provides. Since all strut assemblies are thoroughly checked for damping performance before final assembly of the unit an assembly with the leak path present is readily detected by the low damping force and the unit is automatically rejected for rebuild.

These and other features, objects and advantages of this invention will be more apparent from the following detailed description and drawing in which:

FIG. 1 is a side view partially in crosssection of a large bore damper in the form of a suspension strut incorporating the features of the present invention.

FIG. 2 is an enlarged view of an upper portion of FIG. 1 to illustrate assembly of a large bore damper with a mating large bore piston rod guide properly assembled in the unit.

FIG. 3 is a view similar to the view of FIG. 2 but with the large bore piston rod guide assembled onto a small bore damper which will readily show decreased performance when checked.

Turning now in greater detail to the drawing, there is shown in FIG. 1 a suspension strut 10 having an outer cylindrical support tube 12 on which is mounted a seat 14 for a coil-type suspension spring 16, the upper portion of which is connected by an upper mount to the body work of a vehicle. Such mounting is illustrated in the U.S. Pat. No. 4,175,771 to Muzechuk et al, issued Nov. 27, 1979, for "Resilient Mount Means For MacPherson Strut" and assigned to the assignee of this invention and hereby incorporated by reference. The lower end of the support tube 12 is retained in a mounting bracket 18 which in turn is operatively connected to the steering knuckle of a road wheel assembly. The support tube 12 is closed at its lower end by a lower end cap 20 and extends upwardly from this cap and from bracket 18 to a terminal end 22 which is closed by a seal cover 24 that is threaded at 26 to the inner wall of the upper end of the support tube. A flat bumper plate 28 is welded or otherwise secured on top of the seal cover 24.

The suspension strut illustrated is a "wet build" damper in which the support tube 12 provides a reservoir 29 for holding a portion of the hydraulic shock absorber fluid and, as previously indicated, serves as a suspension load bearing member.

Operatively mounted within the support tube is an elongated "large bore" cylinder tube 30 that forms the inner cylindrical wall of reservoir 29 and extends upwardly from a base valve 32 seated on the lower end cap 20 into engagement with a "large bore" cylindrical rod guide 34 with reduced diameter neck 36 designed to closely and telescopically fit into the upper end of the "large bore" cylinder tube 30 as shown in FIGS. 1 and 2. A piston rod 42 extends upwardly from attachment with a valved piston 44 axially movable in the cylinder tube 30. This piston rod also extends through an axial passage formed by a bushing 45 in the rod guide 34, seal cover 24 and bumper plate 28. The upper end of the piston rod 42 is threaded for attachment to the upper mount as disclosed in the above referenced patent to Muzechuk et al and thereby to the body work of the vehicle.

Disposed beneath the seal cover 24 and in a recess 46 formed in the upper end of the rod guide is an annular seal assembly 48. This seal assembly is conventional with contact scraper lips in sealing contacting with the periphery of the piston rod 42 which reciprocately moves therethrough and prevents hydraulic fluid from escaping from the upper end of the damper especially when the piston rod strokes outwardly in rebound and further provides a dirt scraper and seal when the piston rod strokes inwardly on jounce. The throttling of fluid through the valved piston damps the action of the suspension spring to thereby control the ride motion of the vehicle. Element 52 is a conventional constricting garter spring used with such seal assemblies. In FIG. 2, the "large bore" rod guide 34 is assembled on the large bore cylinder tube 30 and it will be noted that the reduced diameter neck 36 fits closely within the cylinder tube. The lower surfaces 54 of the rod guide neck 36 and bushing 45 have axial flow passages, 56 transverse to the axial rod guide bushing to provide a hydraulic bypass in the event the rod guide is inadvertently assembled on a small bore unit as will be further explained in connection with FIG. 3.

In FIGS. 1 and 2, on jounce (compression), the hydraulic damper collapses and the hydraulic fluid flows from chamber 62 into chamber 60 through the restriction of the piston valving. Excess oil from the volume of piston rod as it strokes inwardly into the cylinder tube flows into reservoir 29 through the restriction of the base valve 32. On rebound stroke in which the unit is elongating, fluid pressure builds in the cylinder chamber 60 above the piston in the cylinder tube and suspension spring action is controlled by oil in chamber 60 being throttled through the conventional valving in the piston 44. As the piston rod telescopes outwardly make up oil is supplied to the cylinder tube from the reservoir 29 through the base valve. In this action, there will be no fluid passage through the passages 56 into the reservoir since that passage is blocked by the wall of the cylinder tube. Accordingly, when checked by the hydraulic testing machines on the assembly, this unit will be found to have optimized performance and assembly properly and ready for packaging and shipment to the vehicle assembler or to repair garages for use as a replacement unit.

In FIG. 3, the neck portion 36 of rod guide 34 has a larger diameter than the "small bore" cylinder tube 66 and when assembled into the damper sits on top of the cylinder tube 66 as shown in FIG. 3. In this position, the piston, not shown, but sized to fit the small bore cylinder tube 66 will, when stroking in rebound, find resistance sharply reduced since the fluid can pass through the axial passages 56 in the bottom of the rod guide into the reservoir chamber as shown by flow arrows A.

This decreased performance is readily apparent when the unit is cycled on the testing machinery and it is automatically rejected for rework with an appropriately sized rod guide so that it will be a unit with optimized performance and service life.

Without the bypass construction of this invention, the large bore rod guide could be seated on top of the small bore cylinder tube and function with good efficiency but the leak path across the interface of the rod guide and cylinder tube although restricted would detract from optimized efficiency and service life.

While a preferred embodiment of this invention has been shown and described to illustrate the invention, other modifications will become apparent to those skilled in the art. Accordingly, the scope of this invention is set forth in the following claims.

The embodiments of the invention in which an exclusive property or privilege is claimed are defined as follows:

1. A method of making and subsequently checking the jounce and rebound action of a hydraulic damper in which a cylinder tube has a piston and piston rod assembly mounted therein for reciporcating sliding movement in said cylinder tube and separating the cylinder tube into first and second chambers, said damper incorporating a second tube radially spaced from and around the cylinder tubes and cooperating therewith to form a reservoir chamber for said damper and a base valve seated on the base cup fixed to the lower end of said cylinder tube to hydraulically interconnect said reservoir tube comprising the steps of providing a piston rod guide for slidably guiding the piston rod of said piston and piston rod assembly, forming a fluid bypass passage in said piston rod guide, mounting said piston rod guide with respect to said cylinder tube so that said rod guide fits within said cylinder tube and said bypass passage is blocked or said end of said rod guide is seated directly on top of said cylinder tube and said bypass passage is opened to said reservoir chamber, axially moving the piston and piston rod assembly in a first direction to decrease the volume of said first chamber to force the fluid from said first chamber through said base valve into said reservoir chamber and checking the resistance to said movement in stroking the piston and rod in a second direction so that fluid is forced from said second chamber through said bypass passage only when said rod guide is seated on top of said cylinder tube thereby reducing the resistance of the movement of the piston in said second direction and indicating that the unit has reduced damping of rebound action.

* * * * *